(12) United States Patent
Kim et al.

(10) Patent No.: US 9,187,801 B2
(45) Date of Patent: Nov. 17, 2015

(54) APPARATUS FOR RECYCLING METAL SCRAPS

(75) Inventors: Eok Soo Kim, Ulsan (KR); Jin Young Park, Ulsan (KR)

(73) Assignee: Korea Institute Of Industrial Technology, Cheonan-Si (KR)

( * ) Notice: Subject to any disclaimer, the term of this patent is extended or adjusted under 35 U.S.C. 154(b) by 438 days.

(21) Appl. No.: 12/822,947

(22) Filed: Jun. 24, 2010

(65) Prior Publication Data

US 2010/0330217 A1 Dec. 30, 2010

(30) Foreign Application Priority Data

Jun. 24, 2009 (KR) .................. 10-2009-0056414

(51) Int. Cl.
| | |
|---|---|
| B30B 9/06 | (2006.01) |
| B30B 11/02 | (2006.01) |
| C22B 1/248 | (2006.01) |
| B30B 9/32 | (2006.01) |
| C22B 1/00 | (2006.01) |
| C22B 7/00 | (2006.01) |

(52) U.S. Cl.
CPC .............. *C22B 1/248* (2013.01); *B30B 9/067* (2013.01); *B30B 9/327* (2013.01); *C22B 1/005* (2013.01); *C22B 7/005* (2013.01); *Y02W 30/54* (2015.05)

(58) Field of Classification Search
CPC .. B29C 45/26; B29C 45/2602; B29C 45/261; B29C 45/2616; B29C 45/2624; B29C 45/2628; C22B 1/005; C22B 7/005; C22B 1/248; B30B 9/047; B30B 9/067; B30B 9/3039; B30B 9/3078; B30B 9/327

USPC ......... 100/104, 110, 111, 126, 127, 179, 906, 100/188 R, 215, 226, 240, 245; 425/78, 197, 425/DIG. 119; 419/66, 67

See application file for complete search history.

(56) References Cited

U.S. PATENT DOCUMENTS

| | | | | |
|---|---|---|---|---|
| 2,347,773 | A | * | 5/1944 | Franz ............................ 249/142 |
| 3,540,709 | A | * | 11/1970 | Fisher et al. .................. 432/111 |
| 7,011,017 | B2 | * | 3/2006 | Satou et al. ................... 100/179 |
| 7,303,160 | B2 | * | 12/2007 | Bouldin et al. ............ 241/101.2 |
| 7,357,074 | B2 | * | 4/2008 | Kraft et al. .................... 100/117 |
| 7,421,946 | B1 | * | 9/2008 | Pontus et al. ................. 100/232 |
| 7,448,318 | B1 | * | 11/2008 | Ralicki ......................... 100/116 |
| 7,631,596 | B2 | * | 12/2009 | Williams et al. ............. 100/149 |
| 2007/0214971 | A1 | * | 9/2007 | Williams et al. ............. 100/149 |

FOREIGN PATENT DOCUMENTS

CN 1457291 A 11/2003

* cited by examiner

*Primary Examiner* — Jimmy T Nguyen
(74) *Attorney, Agent, or Firm* — Christie, Parker & Hale, LLP

(57) ABSTRACT

An apparatus for recycling metal scraps includes a mold having an inner conversion cavity for converting the metal scraps, an inlet disposed in one longitudinal end thereof, and an outlet disposed in the other longitudinal ends thereof, the inlet and the outlet communicating with the cavity; a gate movably mounted near the outlet of the mold so as to open and close the outlet of the mold as the gate moves; a gate actuator moving the gate to an opening or closing position; a scrap feeder supplying the metal scraps into the cavity of the mold, a conversion plunger intruded into the cavity via the inlet of the mold and compacting the metal scraps to form a solid compact having a shape corresponding to the cavity; and a press actuator reciprocating the conversion plunger between inside and outside of the mold so as to provide a conversion pressure.

17 Claims, 4 Drawing Sheets

APPARATUS FOR RECYCLING METAL SCRAPS

CROSS REFERENCE TO RELATED APPLICATION

The present application claims priority from Korean Patent Application Number 10-2009-0056414, filed on Jun. 24, 2009, the entire contents of which are fully incorporated herein by reference.

BACKGROUND OF THE INVENTION

1. Field of the Invention

The present invention relates to an apparatus for recycling metal scraps, and more particularly, to an apparatus for recycling metal scraps that can convert the scraps, produced in the machining of a metal material, into a solid compact having a high specific gravity, so that the scraps are not lost due to oxidation when they are being melt, and convert the scraps without using cutting fluid, thereby reducing the creation of pollutants.

2. Description of Related Art

The process of cutting a metal material produces various types of scraps, such as granular or spiral scraps. The scraps take a sizable amount, which is typically 5 to 10% of the weight of the metal material subjected to the cutting. Therefore, various methods are used to collect and recycle the scraps. For example, as for scraps produced in the cutting of a cast material, the scraps are melted again together with a molten source metal in a melting furnace, so that it can be reused as a raw material in the casting.

However, the collected scraps, which are input into the melting furnace, have a significantly small specific gravity relative to the molten source metal, so that the majority of scraps input into the melting furnace suspends on the surface of the molten metal without immersing into the molten metal while it is being melted. Thus, a great amount of the scraps is oxidized in the melting process by contact with air. Since the oxidized scraps lost their own properties of a source metal, they are screened and disposed. Thus, only 50% to 60% of the input scraps can be reused, thereby raising a problem such as a very low source recovery rate (recycling rate).

To solve this problem, a method had been proposed, in which the molten metal is rotated to make the input scraps immerse more easily in the molten metal, thereby reducing the loss of scraps due to oxidation. However, in order to use this method, special equipments for rotating the molten metal are required and a melting furnace should be separately fabricated to suit to the equipment, so that mounting costs for a melting apparatus increase greatly. Furthermore, the rotation of the molten metal results in a reduction in the lifetime of the melting furnace and an increase in the cost of energy that is consumed in the process.

Further, while there had been proposed a method that the suspended scraps on the surface of the molten metal are forcedly pushed and immersed in the molten metal, a problem also arises in that special equipments for immersing the scraps are required and an installation cost for a melting apparatus increases greatly, and for small, light scraps, it is difficult to immerse them in the molten metal, so that the effects of reducing losses of the scraps due to oxidation are degraded.

Meanwhile, the recovered scraps are impregnated with cutting fluid that is used for cutting a metal material. However, if the scraps impregnated with the cutting fluid are melted as they are, an environmental contamination arises due to combustion of the cutting fluid. To prevent this, according to the related art, a separate washing process for removing the cutting fluid was required. However, because of a large surface area of the scraps, a great amount of cost and time was taken in the washing process, resulting in a further deterioration in a recovery efficiency of the scraps.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an apparatus for recycling metal scraps which can compress the metal scraps to increase the specific gravity while removing cutting oil, thereby preventing oxidation of the scraps that occurs due to suspension on the surface of molten metal when they are being melted, and reducing the creation of pollutants due to combustion of the cutting oil.

In an aspect of the present invention, the apparatus for recycling metal scraps includes: a mold having an inner conversion cavity for converting the metal scraps, an inlet disposed in one longitudinal end thereof, and an outlet disposed in the other longitudinal ends thereof, the inlet and the outlet communicating with the cavity; a gate movably mounted near the outlet of the mold so as to open and close the outlet of the mold as the gate moves; a gate actuator moving the gate to an opening or closing position; a scrap feeder supplying the metal scraps into the cavity of the mold, a conversion plunger intruded into the cavity via the inlet of the mold and compacting the metal scraps to form a solid compact having a shape corresponding to the cavity; and a press actuator reciprocating the conversion plunger between inside and outside of the mold so as to provide a conversion pressure.

In an exemplary embodiment, the apparatus may further include a mold housing fixedly enclosing the mold, in which the mold is provided with a plurality of mold blocks, which is mounted in the mold housing adjacent to each other, thereby to define the cavity.

In an exemplary embodiment, the apparatus may further include a guide pad provided adjacent to the inlet of the mold and having a guide groove guiding the conversion plunger toward the cavity of the mold, and an inlet portion opened in an upper portion of the guide groove.

In an exemplary embodiment, the scrap feeder may include a hopper, which has an outlet facing the inlet portion of the guide pad, and a loader for transporting the scraps, received in the hopper, to the inlet portion of the guide pad.

In an exemplary embodiment, the loader may include a transporting screw provided in a vertical direction in the hopper, a driving mechanism rotating the transporting screw, and a transporting guide provided outside the transporting screw, in which the transporting guide has open scrap inlet and outlet in the upper and lower portion thereof, and a tubular passage between the scrap inlet and outlet.

In an exemplary embodiment, the apparatus may also include an auxiliary loader having a hydraulic cylinder and a push rod, in which the push rod is caused to vertically reciprocate in the hopper by the hydraulic cylinder, thereby transporting the metal scraps towards the outlet of the hopper.

In an exemplary embodiment, the gate may include an opening connected to and disconnected from the inlet of the mold as it moves.

In an exemplary embodiment, the apparatus may also include a guide housing mounted adjacent to a front end of the guide pad, and having therein a guide that movably supports the conversion plunger.

In an exemplary embodiment, the apparatus may also include an oil pan mounted on the lower side of the mold and collecting cutting oil discharged outside when the metal scraps are compressed.

According to exemplary embodiments of the present invention as set forth above, the following effects are provided.

(1) The metal scraps that were produced during processing a metal material are compressed to form a solid compact having a high specific gravity such that the metal scraps are immersed in the molten metal without suspending on the surface of molten metal when they are injected into the molten metal, and also to reduce cutting oil impregnated therein, thereby preventing occurrence of oxidation loss during melting of the metal scraps and thus increasing the recovery rate of the metal scraps and reducing the occurrence of pollutants due to combustion of cutting oil.

(2) The mold is provided with divided mold blocks, which reduce stress applied to the mold upon receiving a molding pressure, so that metal scraps can be compact-converted with a higher molding pressure into a compact having a higher specific gravity in a short time, thereby improving productivity, extending and reducing the lifetime and weight of mold, and providing smooth discharging of the cutting oil and therefore reducing the content of the cutting oil impregnated in the compact furthermore.

(3) The metal scraps received in the hopper are intruded by a certain amount into the mold without congestion by means of the transporting guide and transporting screw of the loader, thereby providing a smooth, precise feeding of the metal scraps and thus improving the productivity of the apparatus.

The methods and apparatuses of the present invention have other features and advantages which will be apparent from, or are set forth in more detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments that may be included within the spirit and scope of the invention as defined by the appended claims.

Figure 1:
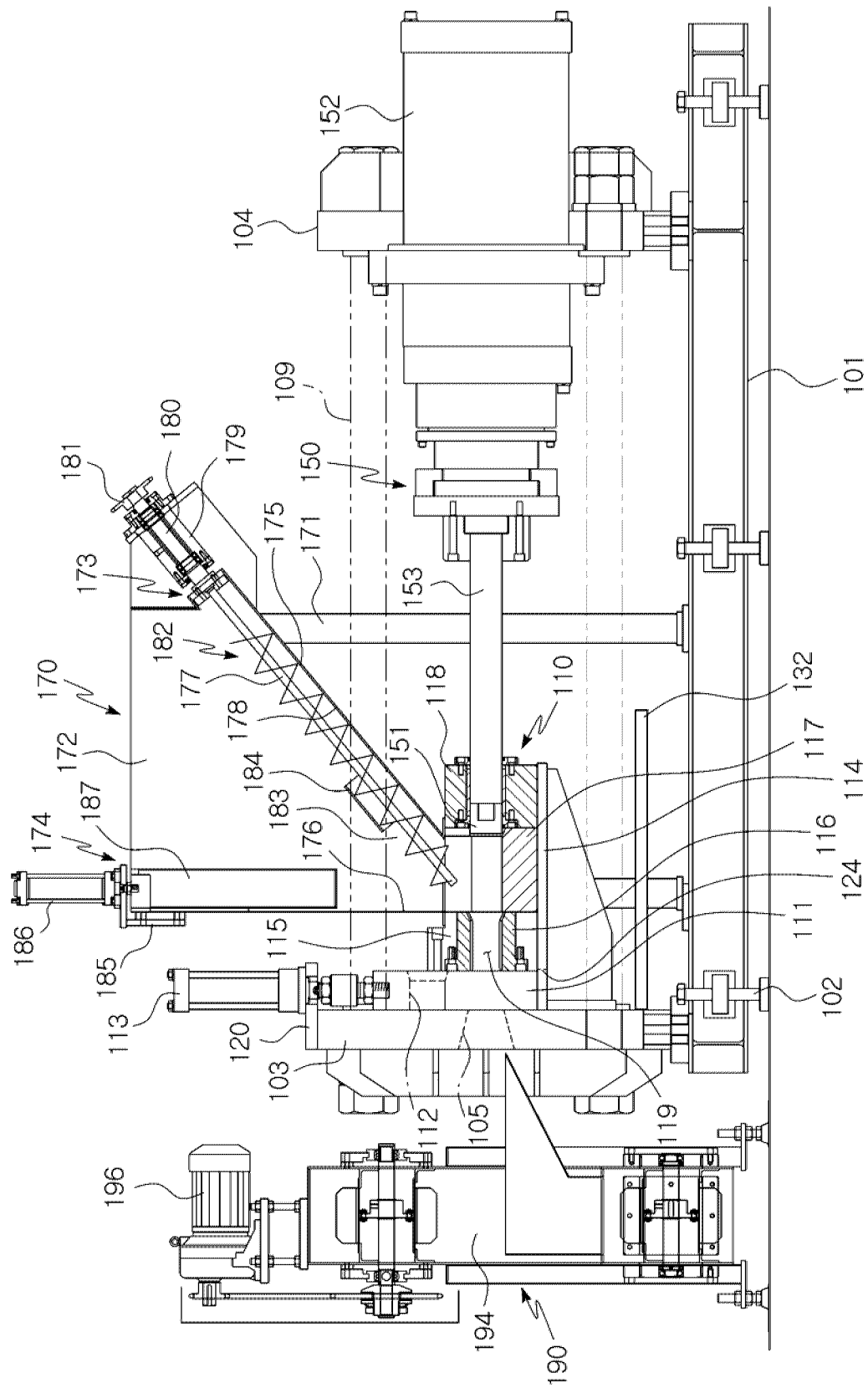
FIG. 1 is a front elevation view showing an apparatus for recycling metal scraps according to an exemplary embodiment of the invention.
Figure 2:
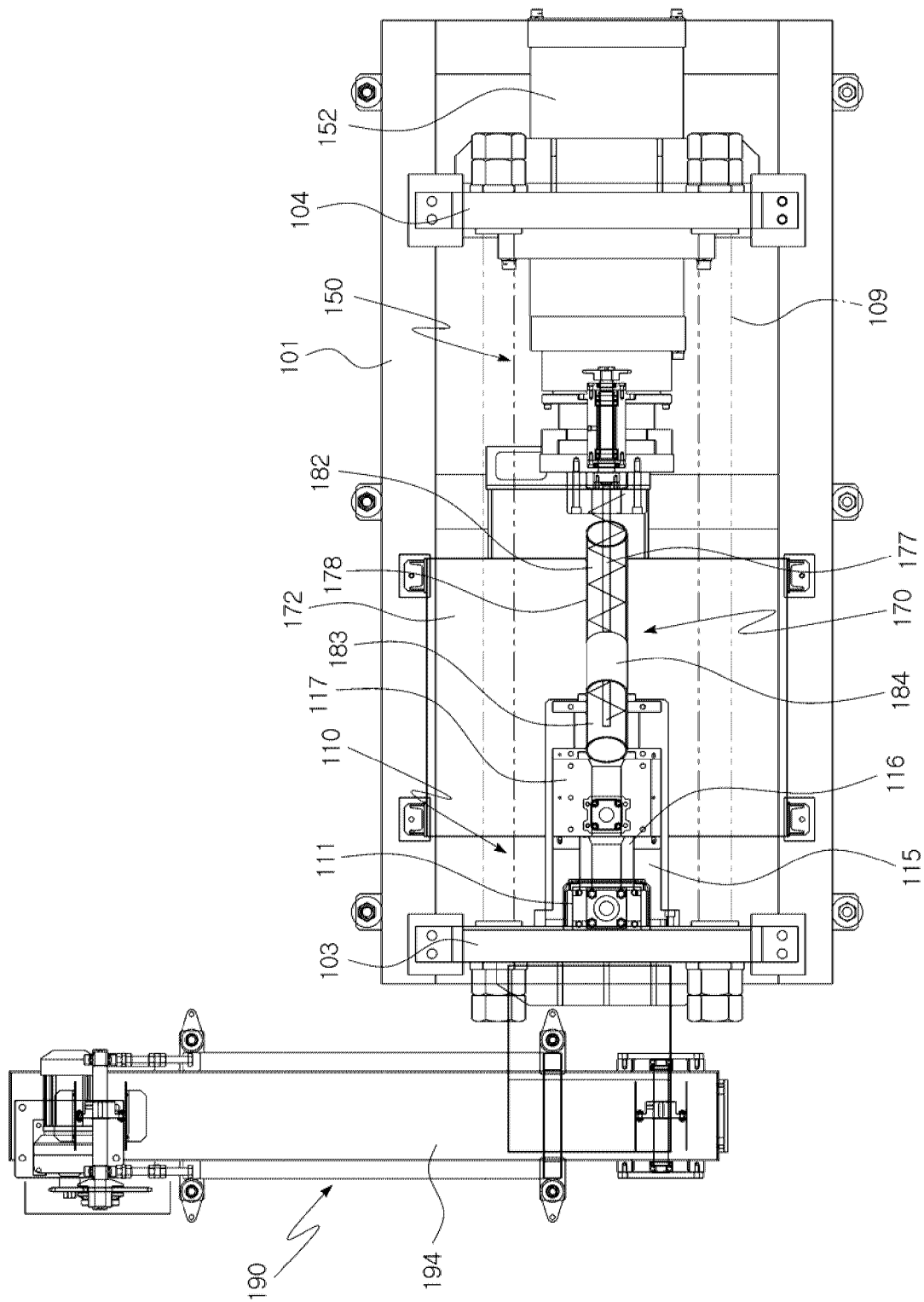
FIG. 2 is a top plan view of the apparatus for recycling metal scraps shown in FIG. 1.
Figure 3:
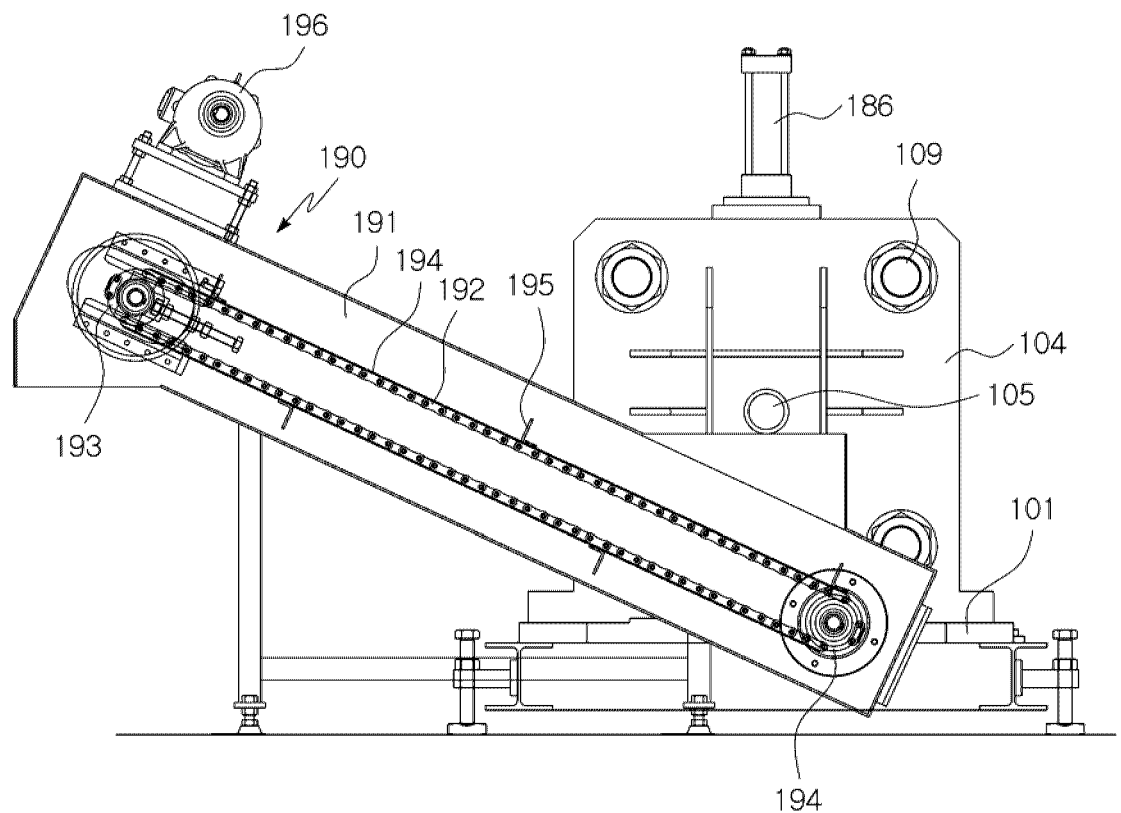
FIG. 3 is a side elevation view of the apparatus for recycling metal scraps shown in FIG. 1.
Figure 4:
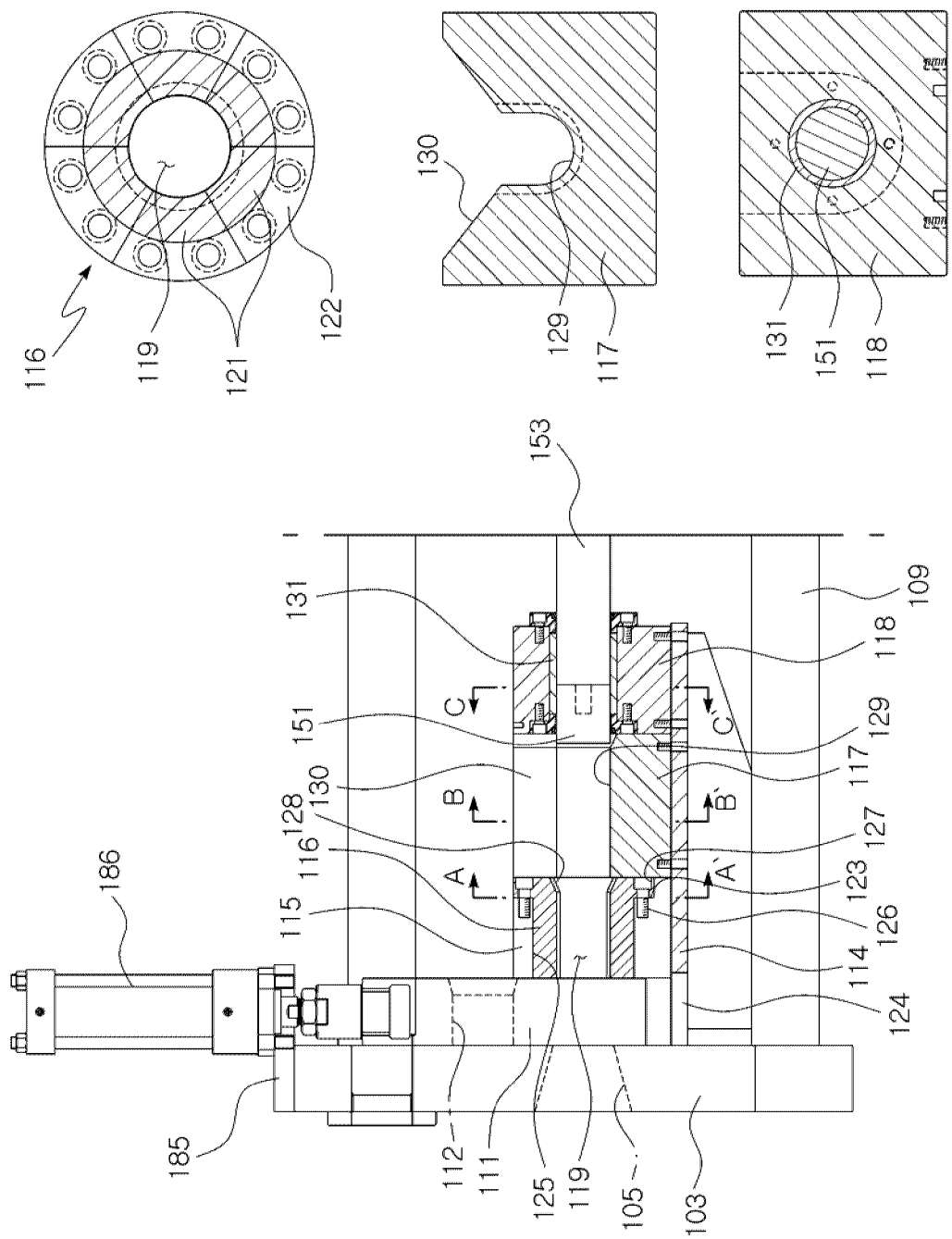
FIG. 4 is an enlargement view of the converter of the apparatus for recycling metal scraps shown in FIG. 1.

FIG. 1 is a front elevation view showing an apparatus for recycling metal scraps according to an exemplary embodiment of the invention, FIG. 2 is a top plan view of the apparatus for recycling metal scraps shown in FIG. 1, FIG. 3 is a side elevation view of the apparatus for recycling metal scraps shown in FIG. 1, and FIG. 4 is an enlargement view of the converter of the apparatus for recycling metal scraps shown in FIG. 1.

As shown in the figures, the apparatus for recycling metal scraps includes a base 101, a front plate 103 provided in front of the base 101, a rear plate 104 provided in the rear of the base 101, a plurality of tie bars 109 connected between the front and rear plates 103 and 104, a converter 110 provided on the front plate 103, a press 150 provided on the rear plate 104, a scrap feeder 170 provided around the converter 110, and a conveyor 190 configured to transport converted materials.

The base 101 is configured to provide a horizontal mounting plane, in which leveling bolts 102 are provided in certain intervals.

The front plate 103 and the rear plate 104 support the converter 110 and the press 150, respectively, and are fastened with each other by the tie bars 109, so that they can maintain the position when a conversion pressure is applied thereto. The front plate 103 has an outlet 105 that forms a discharge passage of compacts that are produced by compression in the converter 110. The outlet 105 can be flared in the discharge direction in order to facilitate discharge of the converted materials.

The converter 110 receives the scraps supplied thereto, and produces converted materials in the form of single solid compacts from the scraps by compressing the scraps under the pressure applied from the press 150. In the converter 110, a gate 111 is connected to the inner side of the front plate 103 such that it can move up and down, and a gate actuator 113 is provided to drive the gate 111 up and down. Below the gate 111, a bracket 114 is mounted on the front plate 103, extending in the horizontal direction. A mold housing 115 is connected to the gate 111 and is fixedly provided on the upper portion of the bracket 114, and a mold 116 is provided inside the mold housing 115. A guide pad 117 is connected to the mold 116 and fixedly provided on the upper portion of the bracket 114. A guide housing 118 is connected to the guide pad 117 and is fixedly provided on the upper portion of the bracket 114.

The gate 111 blocks and communicates the inside of the mold 116 from and with the outlet 105 of the front plate 103. In the blocking position, the gate 111 cooperates with the mold 116 to define a cavity 119 where metal scraps are converted. In the open position, the inside of the mold 116 communicates with the outlet 105 of the front plate 103 such that a compressed compact can be discharged from the mold 116 through the outlet 105. For this, both the right and left sides of the gate 111 are coupled with the front plate 103 in such a fashion that the gate 111 can slide up and down. The gate 111 also has an opening 112 in the upper central portion thereof. The opening 112 of the gate 111 can have a guide section in one side thereof that faces the mold 116, the guide section flared toward the mold 116 to facilitate the discharge of the compact.

The gate actuator 113 serves to move the gate 111 up and down so that the gate 111 allows the inside of the mold 116 to communicate with the outlet 105 in one position (e.g., a raised position) but blocks the inside of the mold 116 from the outlet 105 in the other position (e.g., a lowered position). The gate actuator 113 can be embodied as an actuator that performs a linearly-reciprocating motion, such as an electromotive actuator using a motor or an electromagnet. In this embodiment, the gate actuator is illustrated as a hydraulic cylinder that is coupled with a fixing member 120 on the upper portion of the front plate 103 and has a rod coupled with the upper portion of the gate 111.

The bracket 114 provides a horizontal mounting plane where the mold guide 115, the guide pad 117 and the guide housing 118 can be collinearly arranged. The bracket 114 has a passage 124 in one end thereof, which is coupled with the front plate 103, such that the gate 111 can move up and down through the passage 124.

The mold housing 115 encloses the mold 116 therein, and serves to maintain the shape of the mold 116 while resisting against pressure that is applied when the mold 16 is operating. The mold housing 115 defines therein a mold-receiving portion 125, a seating portion 123 in one end of the mold-receiving portion 125, and a plurality of bolt holes 126 formed radially in the seating portion 123, the bolt holes 126 spaced apart from each other at predetermined intervals.

The mold 116 is configured to convert metal scraps, which are supplied into the mold 116, into a solid compact. The mold 116 is in the form of a sleeve that has an open entrance in one longitudinal end thereof and an open exit in the other longitudinal end thereof, and also has an inclined portion 128 that expands in diameter to facilitate introduction of the scraps, which are subject to conversion.

Although the mold 116 can be formed as one body, it is preferred that the mold 116 be formed of a plurality of separate mold blocks 121, as shown in the upper right part of FIG. 4. Each of the mold blocks 121 is in the form of an arc, such that they can define therein a cavity 119 having a circular cross section when fitted inside the mold housing 115. A flange 122 is provided on one end of each mold block 121, which forms the entrance of the mold 116. A plurality of the flanges 122 is intruded into the seating portion 123 of the mold housing 115 to support the conversion pressure. A plurality of coupling holes 127, corresponding to the bolt holes 126, are formed in the flanges 122, such that the individual mold blocks 121 are coupled with the mold housing 115 via bolts.

The guide pad 117 is configured to receive scraps supplied from the scrap feeder 170 so that the received scraps are input into the mold 116 by a conversion plunger 151 of the press 150. The guide pad 117 has a guide groove 129, which guides the movement of the conversion plunger 151 in the same direction as the cavity 119 of the mold 116 does, and an open loading portion 130 above the guide groove 129, so that the scraps can be supplied into the loading portion 130. Preferably, the loading portion 130 can have a shape that expands upward.

The guide housing 118 is configured to guide the movement of the conversion plunger 151 while supporting the same. The guide housing 118 has a guide 131 mounted therein such that the conversion plunger 151 can be intruded into the guide 131 in the same direction as in the guide groove 129 of the guide pad 117.

In addition, an oil pan 132 is provided below the converter 110, and collects cutting fluid that is discharged when the scraps are being compressed.

The press 150 includes a press actuator 152, which is fixed to the rear plate 104 and is arranged in the horizontal direction, a push rod 153, which is reciprocally moved by the press actuator 152 to and from the converter 110, and a conversion plunger 151, which is coupled to one end of the push rod 153 to force the scraps input into the converter 110.

In this embodiment, the press actuator 152, which provides the scraps-converting pressure and force to the conversion plunger 151, is illustrated and described as a hydraulic cylinder, which has an operating rod that can be extended and compressed. However, the press actuator can also be embodied as various types of actuators that perform a linearly-reciprocating motion using a motor or an electromagnet.

The push rod 153 is coupled to a movable portion of the press actuator 152, for example, an outer portion of the operating rod, and is intruded into the converter 110 through the guide 131 of the guide housing 118, so as to reciprocally move the conversion plunger 151 into and out of the cavity 119 of the mold 116 along the guide groove 129 of the guide pad 117.

When the conversion plunger 151 is reciprocated by the push rod 153, it forces the scraps, loaded in the upper portion of the guide pad 117, into the cavity 119 of the mold 116 so that the scraps are converted into the form of a high-density block. Although the conversion plunger 151 can be provided integral with the push rod 153, the conversion plunger 151 is provided as a separate member that is detachably coupled with the push rod 153 in order to facilitate replacement. This can reduce manufacturing costs and maintenance cost of the apparatus.

The scrap feeder 170 includes a support 171 erected from the base 101, a hopper 172 provided above the converter 110 by the support 171, an inclined loader 173 provided in one region inside the hopper 172, and an auxiliary loader 174 erected in the other region inside the hopper 172.

The hopper 172 is configured to have an expanding entrance in the upper portion and a narrowing exit in the lower portion. The exit is positioned above the loading portion 130 of the guide pad 117. The hopper 172 can be designed with various shapes. However, in this embodiment, the hopper 172 is illustrated to have a slope 175 in one region and a vertical surface 176 in the other region in order to facilitate installation and operation of the loader 173 and the auxiliary loader 174.

The loader 173 supplies the metal scraps from the hopper 172 to the guide pad 117 by forcing down the metal scraps through the exit. The loader 173 includes a rotatable transport screw 177 arranged on the slope 175 of the hopper 172, a driving mechanism for rotating the transport screw 177, and a transport guide 178 provided around the transport screw 177.

The driving mechanism of the loader 173 includes a shaft holder 179 fixed on the upper portion of the hopper 172, a rotary shaft 180 rotatably fitted into and coupled with the shaft holder 179, with one end thereof coupled with the transport screw 177, a follower sprocket 181 coupled with the outer end of the rotary shaft 180, a drive sprocket (not shown) connected to the follower sprocket 181 via a chain, and a motor (not shown) for rotating the drive sprocket.

The transport guide 178 has an open scrap inlet 182 in the upper portion, a scrap outlet 183 in the lower portion, and a guide 184 having a circular tubular passage that extends from the inlet 182 to the outlet 183.

The auxiliary loader 174 serves to force the metal scraps, congested inside the hopper 172, toward the exit. The auxiliary loader 174 includes an air cylinder 186 erected in the upper portion of the hopper 172 by the support 185 so as to apply a downward force and a movable pusher 187 coupled with a rod of the air cylinder 186 to reciprocally move along the inner surface of the hopper 172.

The compact conveyor 190 serves to convey a compact, which is discharged from the converter 110 after having been compressed. Although the scrap conveyor 190 can be formed as various types of conveyors, it is illustrated as a belt conveyor in this embodiment. The illustrated compact conveyor 190 includes a drive sprocket 193 provided on one longitudinal end of the frame 191 so as to be rotatable by a motor 196, a follower sprocket 194 provided on the other longitudinal end of the frame 191 and connected with the drive sprocket 193 via a chain 192, and a conveyor-belt 194 driven by the chain 192. Holder plates 195, which support the compact, are provided on the conveyor belt 194 at certain intervals.

Below, a description will be given of the operation of the apparatus for recycling metal scraps according to an exemplary embodiment of the invention.

Metal scraps, input into the hopper 172 of the scrap feeder 170, are supplied into the converter 110. If the scraps are simple particles, they can be naturally supplied by the weight thereof. The scraps are generally tangled with each other when collected, since they have complicated shapes. In general, it is impossible to naturally supply the scraps. Therefore, the loader 173 is operated to forcibly supply the scraps. That is, as the transport screw 177 is rotated, the scraps received in the hopper 172 are introduced into the transport guide 178 through the scrap inlet 182, discharged through the outlet 183, and then supplied into the loading portion 130 of the guide pad 117. In addition, in some cases, the movable pusher 187 of the auxiliary loader 174 is moved up and down to supply a remaining amount of the scraps into the guide pad 117.

When the scraps are supplied as above, the press actuator 152 drives the conversion plunger 151 into the converter 110, thereby compressing and converting the scraps. That is, the conversion plunger 151 pushes the scraps into the mold 116 while proceeding on the guide pad 117 through the inside of the guide 131, thereby converting the scraps into a tightly-compressed solid compact.

When the compression of the scraps is completed inside the mold 116 as above, the gate 111 is lowered and the exit of the mold 116 is moved to a position that communicates with the outside through the opening 112 and the outlet 105, so that the compact is discharged to the conveyor 190. Afterwards, the discharged compact is transported to a next process site by the conveyor 190 and is input into a molten metal for reuse as a casting material.

When the scrap compact is produced by the apparatus for recycling metal scraps according to an exemplary embodiment of the invention as above, it has a specific gravity equal to or more than that of the molten source metal. Thus, when the scrap compact is melted in the molten metal, it sinks inside the molten metal without floating on the surface of the molten metal. Therefore, it is possible to prevent the scraps from being lost due to oxidation, thereby significantly improving the recovery rate of the scraps.

Furthermore, the apparatus for recycling metal scraps according to an exemplary embodiment of the invention is configured such that the mold 116 is divided into a plurality of the mold blocks 121. The stress applied to the mold 116 due to the conversion pressure is significantly reduced compared to that in the integral structure. This, as a result, makes it possible to convert scraps having a high specific gravity into a compact in a short time by applying a high conversion pressure to the scraps. In addition, it is possible to reduce the weight of the mold while increasing the lifetime thereof.

Moreover, cutting fluid, input together with the scraps, is discharged to the outside through the gaps between the individual mold blocks 121 of the mold 116 and is then collected by the oil pan 132. Therefore, it is possible to raise the recovery rate of the cutting fluid and significantly reduce the content of the cutting fluid in the converted scrap compact, thereby significantly decreasing the amount of pollutants which would otherwise occur in a significant amount.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for recycling metal scraps, comprising:
a mold having a cavity for converting the metal scraps, an inlet disposed in one longitudinal end thereof, and an outlet disposed in another longitudinal end thereof, the inlet and the outlet communicating with the cavity;
a gate movably mounted near or adjacent the outlet of the mold so as to open and close the outlet;
a gate actuator moving the gate to an open or closed position;
a scrap feeder for supplying the metal scraps into the cavity of the mold, a conversion plunger intruded into the cavity via the inlet of the mold and compacting the metal scraps to form a solid compact having a shape corresponding to the cavity;
a press actuator reciprocating the conversion plunger between inside and outside of the mold so as to provide a conversion pressure; and
a mold housing enclosing the mold, wherein the mold comprises a plurality of mold blocks, each of said plurality of mold blocks having an arcuate shape for defining only a circumferential portion of the cavity, wherein each of said plurality of mold blocks are mounted in the mold housing adjacent to each other defining the cavity and radially relative to the cavity, wherein each mold block is adjacent to one mold block of said plurality of mold blocks on its left side and to another of said plurality of mold blocks on its right side opposite its left side as viewed from a front of said outlet, wherein an inner surface of said mold tapers from a larger diameter to a smaller diameter from the inlet in a direction toward the outlet.

2. The apparatus according to claim 1, further comprising a guide pad provided adjacent to the inlet of the mold and having a guide groove guiding the conversion plunger toward the cavity of the mold, and an inlet portion opening in an upper portion of the guide groove.

3. The apparatus according to claim 2, wherein the scrap feeder includes a hopper which has an outlet facing the inlet portion of the guide pad, and a loader for transporting the scraps received in the hopper to the inlet portion of the guide pad.

4. The apparatus according to claim 3, the loader includes a transporting screw provided in a vertical direction in the hopper, a driving mechanism rotating the transporting screw, and a transporting guide provided outside the transporting screw, wherein the transporting guide has an open scrap inlet and outlet in an upper and a lower portion thereof, and a tubular passage between the scrap inlet and outlet.

5. The apparatus according to claim 4, further comprising an auxiliary loader having a hydraulic cylinder and a push rod, wherein the push rod is caused to vertically reciprocate in the hopper by the hydraulic cylinder, thereby transporting the metal scraps towards the outlet of the hopper.

6. The apparatus according to claim 2, wherein the scrap feeder includes a hopper, which has an outlet facing the inlet portion of the guide pad, and a loader for transporting the scraps, received in the hopper, to the inlet portion of the guide pad.

7. The apparatus according to claim 6, wherein the loader includes a transporting screw provided in a vertical direction in the hopper, a driving mechanism rotating the transporting screw, and a transporting guide provided outside the transporting screw, wherein the transporting guide has an open scrap inlet and an outlet in an upper and a lower portion thereof, and a tubular passage between the scrap inlet and outlet.

8. The apparatus according to claim 7, further comprising an auxiliary loader having a hydraulic cylinder and a push rod, wherein the push rod is caused to vertically reciprocate in the hopper by the hydraulic cylinder, thereby transporting the metal scraps towards the outlet of the hopper.

9. The apparatus according to claim 1, wherein the gate includes an opening connected to and disconnected from the inlet of the mold as it moves.

10. The apparatus according to claim 2, further comprising a guide housing mounted adjacent to a front end of the guide pad, and having therein a guide that movably supports the conversion plunger.

11. The apparatus according to claim 1, further comprising an oil pan mounted on a lower side of the mold and collecting cutting oil discharged outside when the metal scraps are compressed.

12. The apparatus according to claim 1, wherein the gate includes an opening connected to and disconnected from the inlet of the mold as it moves.

13. The apparatus according to claim 1, further comprising an oil pan mounted on a lower side of the mold and collecting cutting oil discharged outside when the metal scraps are compressed.

14. The apparatus according to claim 1, further comprising:
a flange provided on one end of each mold block defining the inlet of the mold, wherein a plurality of the flanges engage a seating portion of the mold housing to support the conversion pressure; and
a plurality of coupling holes, corresponding to bolt holes formed on the mold housing, are formed on the flanges, wherein said mold blocks are coupled with the mold housing with bolts.

15. The apparatus according to claim 1, wherein each mold block comprises a flange, wherein said flanges define an entrance to said mold.

16. The apparatus according to claim 15, wherein at least a coupling hole is formed through each flange receiving a fastener for fastening each mold block to the mold housing.

17. The apparatus according to claim 1, wherein the inlet has a greater diameter than the outlet.

* * * * *